(12) United States Patent
Miller

(10) Patent No.: US 6,296,172 B1
(45) Date of Patent: Oct. 2, 2001

(54) METHOD OF SEALING DISK SLOTS FOR TURBINE BUCKET DOVETAILS

(75) Inventor: Mark Lloyd Miller, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/536,853

(22) Filed: Mar. 28, 2000

(51) Int. Cl.[7] ............................... B23K 1/06; B63H 1/20
(52) U.S. Cl. ........................................ 228/110.1; 228/138
(58) Field of Search .................................. 228/110.1, 138, 228/173.2, 112.1; 416/213 R, 219 R; 29/889.21, 889.23, 889.721

(56) References Cited

U.S. PATENT DOCUMENTS

| | | | |
|---|---|---|---|
| 4,792,079 | 12/1988 | Bansemir | 228/1.1 |
| 4,826,067 | 5/1989 | Butler | 228/1.1 |
| 4,897,519 | * 1/1990 | Clark et al. | |
| 5,139,389 | 8/1992 | Eng et al. | 416/248 |
| 5,366,344 | * 11/1994 | Gillbanks et al. | |
| 5,494,207 | 2/1996 | Asanasavest | 228/110.1 |
| 5,558,500 | 9/1996 | Elliott et al. | 416/220 R |
| 6,062,362 | * 5/2000 | Costin et al. | |

* cited by examiner

Primary Examiner—Patrick Ryan
Assistant Examiner—Jonathan Johnson
(74) Attorney, Agent, or Firm—Patrick K. Patnode; Douglas E. Stoner

(57) ABSTRACT

Dovetail seals are quickly and inexpensively applied to turbine buckets or rotor disks by ultrasonically welding a piece of material onto the dovetail portion of the bucket or the disk slot of the rotor disk. The method includes placing the piece of material into contact with the appropriate turbine structure and applying a compressive force so as to press the piece of material against the turbine structure. Ultrasonic energy is then applied to the piece of material so as to ultrasonically weld it to the turbine structure.

14 Claims, 3 Drawing Sheets

METHOD OF SEALING DISK SLOTS FOR TURBINE BUCKET DOVETAILS

BACKGROUND OF THE INVENTION

This invention relates generally to blades or buckets used in gas turbine engines and more particularly to applying dovetail seals to turbine buckets.

A gas turbine engine includes a compressor that provides pressurized air to a combustion section where the pressurized air is mixed with fuel and ignited for generating hot combustion gases. These gases flow downstream to one or more turbine stages that extract energy therefrom to drive the compressor and provide useful work such as generating electricity or powering an aircraft in flight. Each turbine stage includes a plurality of circumferentially spaced apart blades or buckets extending radially outwardly from a rotor disk that rotates about the centerline axis of the engine. Each bucket is mounted on the rotor disk through the engagement of a dovetail portion in a corresponding disk slot. An airfoil portion extends radially outward into the hot combustion gas flow.

Because they are exposed to high temperature combustion gases, the buckets are ordinarily cooled to keep their temperatures within certain design limits. One common approach to cooling buckets is to pass a suitable coolant through an internal cooling circuit in the bucket. The coolant normally enters the internal cooling circuit through one or more inlets in the bottom of the bucket dovetail and exits through airfoil tip holes and/or cooling holes formed in the airfoil surface. Known cooling circuits often include a plurality of radially oriented passages that are series-connected to produce a serpentine path, thereby increasing cooling effectiveness by extending the length of the coolant flow path.

Since the dovetail inlets are in fluid communication with the disk slot in which each dovetail is located, the coolant is delivered to the inlets via the respective disk slots. However, leakage of coolant from the disk slots will result in reduced coolant flow to the bucket and a corresponding reduction in the service life of the bucket. Thus, it is desirable to seal leakage paths between each dovetail and the slot in which it is mounted. One approach to such sealing is to apply metal stripes to specified areas of the dovetail. When the bucket is mounted to the rotor disk by driving the dovetail into the slot, excess stripe material is sheared off, leaving a patch of material adhered to the dovetail and filling the corresponding gap between the dovetail and the slot. Accordingly, the corresponding portion of the slot is sealed.

Presently, the stripe material is ordinarily applied to the dovetail using thermal spraying techniques. This method requires extensive masking and is very time-consuming and expensive. Accordingly, it would be desirable to be able to apply dovetail seals quickly and inexpensively.

SUMMARY OF THE INVENTION

The above-mentioned need is met by the present invention, which provides a method of sealing the disk slot of a turbine rotor disk by ultrasonically welding a piece of material onto the dovetail portion of a turbine bucket or the disk slot of the rotor disk.

The present invention and its advantages over the prior art will become apparent upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
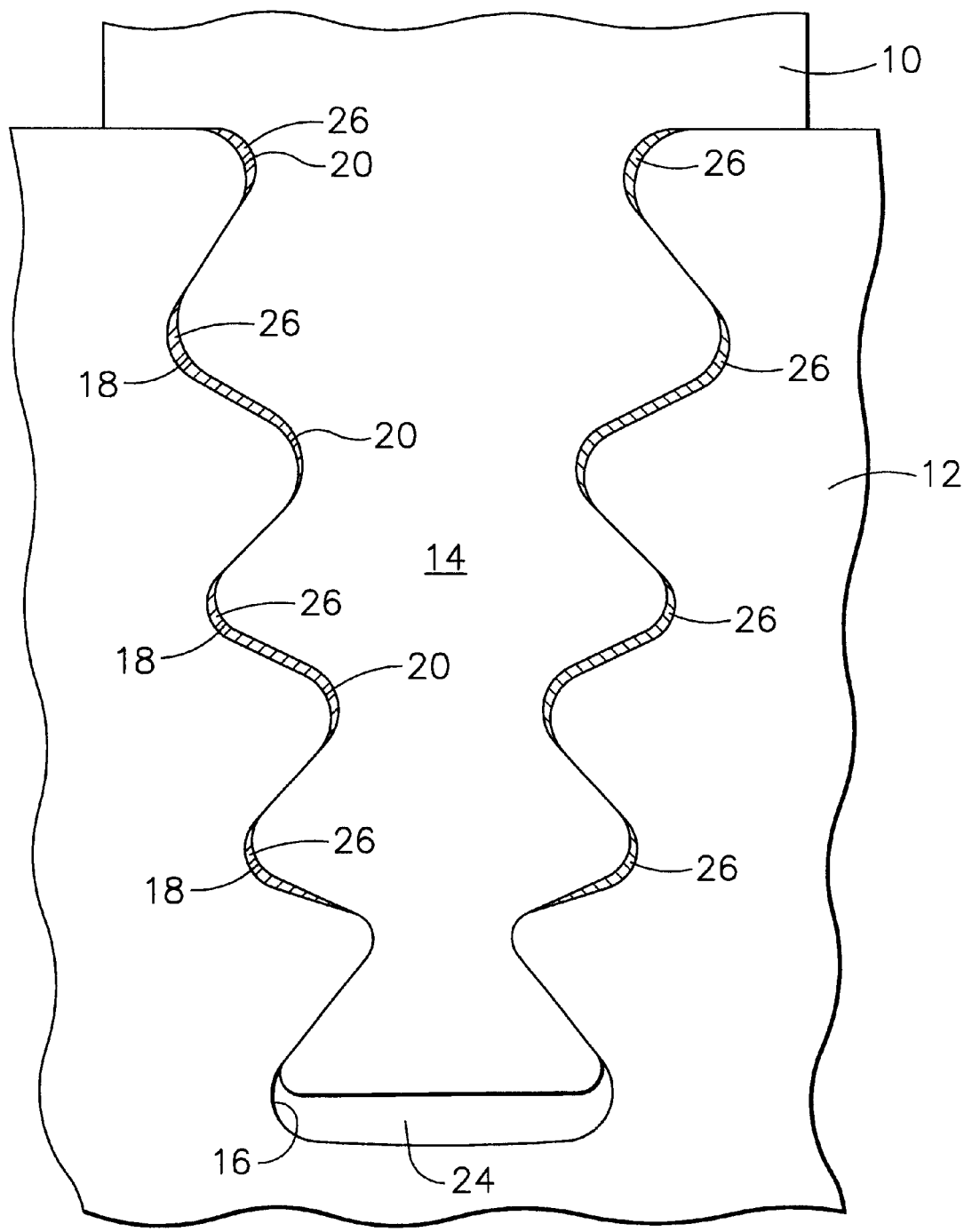
FIG. 1 is a partial, axial end view of a turbine rotor disk including a turbine bucket having dovetail seals.
Figure 2:
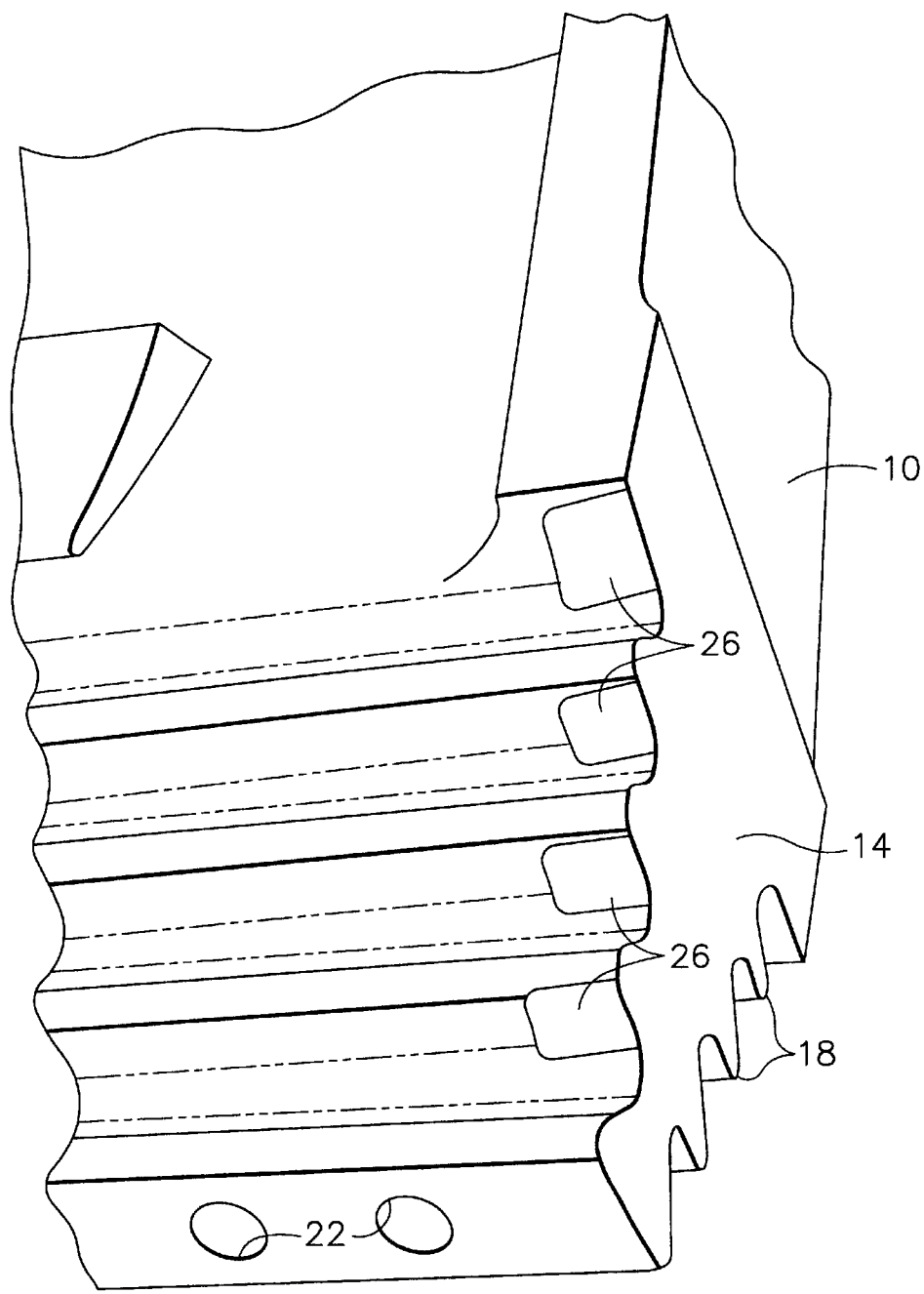
FIG. 2 is a perspective view of the turbine bucket of FIG. 1.

Referring to the drawings wherein identical reference numerals denote the same elements throughout the various views, FIGS. 1 and 2 show an exemplary turbine bucket 10, which is one of a plurality of such buckets mounted to a turbine rotor disk 12 that rotates about the centerline axis of a gas turbine engine. The bucket 10 includes a dovetail portion 14 for mounting the bucket 10 in a corresponding disk slot 16 formed in the rotor disk 12. Specifically, the dovetail portion 14 includes one or more lobes 18 that engage one or more complementary lobes 20 on the disk slot 16. The dovetail portion 14 and the disk slot 16 are shown to have the so-called fir tree shape although other suitable configurations may be utilized. The bucket 10 is axially loaded into the disk slot 16 and radially retained therein due to the complementary interlocking configurations of the dovetail lobes 18 and the slot lobes 20. The bucket 10 is preferably formed as a one-piece casting of a suitable alloy, such as a nickel-based superalloy, which has acceptable strength at the elevated temperatures of operation in the gas turbine engine.

The bucket 10 includes an airfoil portion (not shown) that extends radially outward from the dovetail portion 14. As is known in the art, the airfoil portion has an internal cooling circuit through which a suitable coolant is passed to keep the bucket temperature within design limits. The coolant enters the internal cooling circuit through one or more inlets 22 (FIG. 2) formed in the bottom of the dovetail portion 14 and located in fluid communication with a passage 24 (FIG. 1) defined by the bottom of the disk slot 16. During operation of the gas turbine engine, coolant is delivered to the passage 24 in a conventional manner from a source that may include, but is not limited to, the engine's compressor. Coolant flows from the passage 24 into the internal cooling circuit of the bucket 10 through the inlets 22.

In one preferred embodiment, the disk slot 16 is sealed by ultrasonically welding one or more seals 26 to either one of the bucket 10 or the rotor disk 12 at a location that is appropriate to prevent undesirable leakage of coolant from the passage 24. That is, the seals 26 can be applied to an appropriate location on the dovetail portion 14 or, alternatively, to an appropriate location in the disk slot 16. As shown in FIGS. 1 and 2, the seals 26 comprise pieces of material strategically placed on the dovetail lobes 18, at one end thereof, so as to fill corresponding gaps between the dovetail lobes 18 and the slot lobes 20. Thus, the seals 26 prevent coolant leakage from the corresponding end of the disk slot 16. It should be noted however that this is simply one exemplary seal arrangement used to illustrate the inventive concept. Other seal placements are possible depending on bucket design and the cooling configuration. The seals 26 are preferably made of a suitable metal material such as aluminum.

Figure 3:
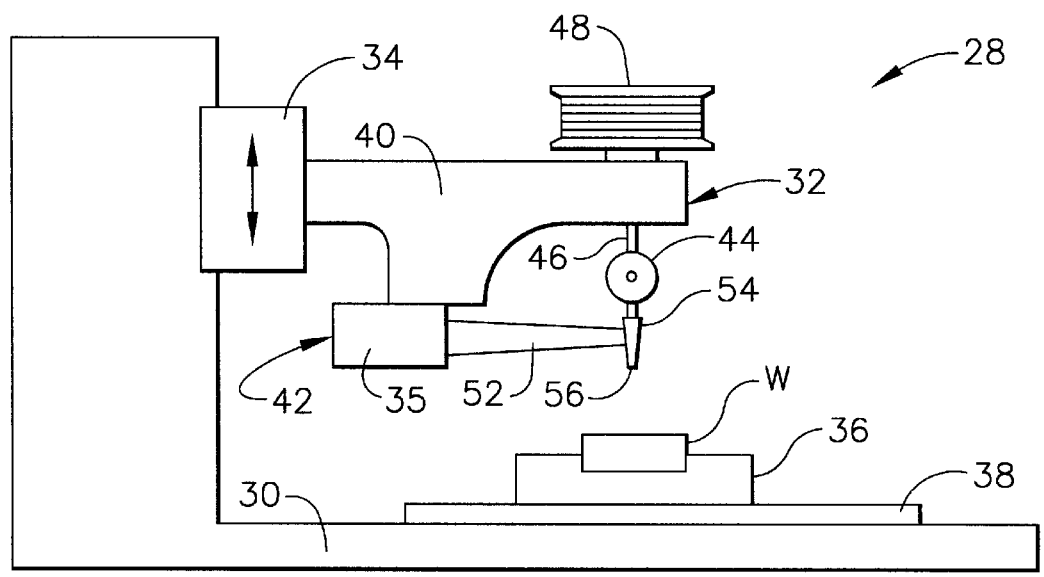
FIG. 3 is a schematic view of an ultrasonic welding apparatus.

Referring now to FIG. 3, an ultrasonic welding apparatus 28 used for welding the seals 26 onto a workpiece W is shown. As mentioned above, the seals 26 can be welded to either the dovetail portion 14 or the disk slot 16. Thus, the workpiece W is intended to encompass both the bucket 10 and the rotor disk 12. That is, either one of the bucket 10 or the rotor disk 12 could be the workpiece W of FIG. 3. The ultrasonic welding apparatus 28 includes a base 30 and a welding head 32 moveably mounted to the base 30 via a ram 34. A work holding fixture 36 is mounted on a platform 38, which is moveably mounted to the base 30. The platform 38 is moveable in two horizontal axes with respect to the base 30 so as to position the fixture 36 (to which the workpiece W is secured) below the welding head 32. The ram 34 moves vertically by known means (not shown) so as to move the welding head 32 into and out of welding engagement with the workpiece W.

The welding head 32 includes a frame 40 that is fixed to the ram 34 and a transducer system 42 attached to the frame 40. A conventional wire feeding mechanism 44 for advancing and cutting bonding wire 46 is also mounted on the frame 40. A spool 48 of wire is mounted atop the frame 40 and provides a supply of the bonding wire 46, which is preferably, but not necessarily, aluminum wire. It should be noted that the pieces of material that make up the seals 26 are not limited to wire, but could be in many other forms, such as strips of aluminum or the like. The primary components of the transducer system 42 are an ultrasonic transducer 50, a horn 52 and a weld tip 54. The feeding mechanism 44 provides a desired length of bonding wire to the weld tip 54, which includes a lower contact surface 56 that presses the bonding wire 46 against the workpiece W.

The ultrasonic transducer 50 includes one or more piezoelectric or magnetostrictive transducer elements that convert high frequency electrical energy produced by a conventional generator (not shown) into mechanical energy in the form of longitudinally propagated ultrasonic energy waves. The horn 52 couples the longitudinally propagating ultrasonic waves to the weld tip 54, resulting in ultrasonic transverse motion of the weld tip 54 that causes the bonding wire 46 to be welded to the workpiece W.

In operation, a workpiece W (i.e., either a bucket 10 or a rotor disk 12) is secured in the fixture 36 and then positioned with respect to the welding head 32 by adjustment of the platform 38. Once the workpiece W is properly located for the welding operation, an appropriately sized piece of the bonding wire 46 is produced by the wire feeding mechanism 44, which advances and cuts the piece of bonding wire 46 in a known manner. The welding head 32 is moved vertically downward via the ram 34 so as to press the piece of bonding wire 46 into contact with the workpiece W. The bonding wire 46 is strategically placed in contact with the workpiece W at a location thereon where a seal 26 is desired. The ram 34 moves the welding head 32 downwardly such that the contact surface 56 presses the piece of bonding wire 46 against the workpiece W with a force sufficient to achieve ultrasonic welding. Typically, a compressive force in the range of 50–1000 pounds, depending on the type of material being welded, will be applied.

The ultrasonic transducer 50 is energized to produce ultrasonic transverse motion in the weld tip 54. Ultrasonic energy is thus applied to the piece of bonding wire 46, which causes the piece of bonding wire 46 to be welded to the workpiece W. The ultrasonic transducer 50 is energized at frequencies in the range of about 15–40 kHz and for a short time period, typically 0.05–1.0 seconds. The welding head 32 is retracted upon completion of the welding operation.

The platform 38 can then be adjusted to reposition the bucket with respect to the welding head 32 for a subsequent welding operation, such as welding another piece of wire material to another one of the dovetail lobes 18.

Once all of the pieces of material have been ultrasonically welded to the workpiece W (be it either a bucket 10 or a rotor disk 12), the bucket 10 is mounted to the rotor disk 12 by axially driving the dovetail portion 14 into the disk slot 16. As the dovetail portion 14 is driven into the disk slot 16, excess seal material is sheared off at the mating edges of the dovetail portion 14 and the disk slot 16, leaving a portion of each piece adhering to the dovetail portion 14 or the disk slot 16 as the case may be. The remaining portions fill the corresponding gaps between the dovetail portion 14 and the disk slot 16, thereby creating the seals 26 and sealing the disk slot 16.

The structure of the seal material may be intentionally weakened internally so as to facilitate the shearing-off process. This ensures that the material failure or shearing will always occur at the shearing edge and not at the surface of the dovetail portion 14 or the disk slot 16. Failure at the surface of the dovetail portion 14 or the disk slot 16 would cause the material to flake off. The intentional weakening can be accomplished by using bonding wire 46 that is formed from a plurality of wound strands instead of being a solid material. The subsequently welded piece of material would have internal defects such as pores and oxide inclusions and would thus be more likely to fail internally than a welded piece of material formed from a solid wire.

Figure 4:
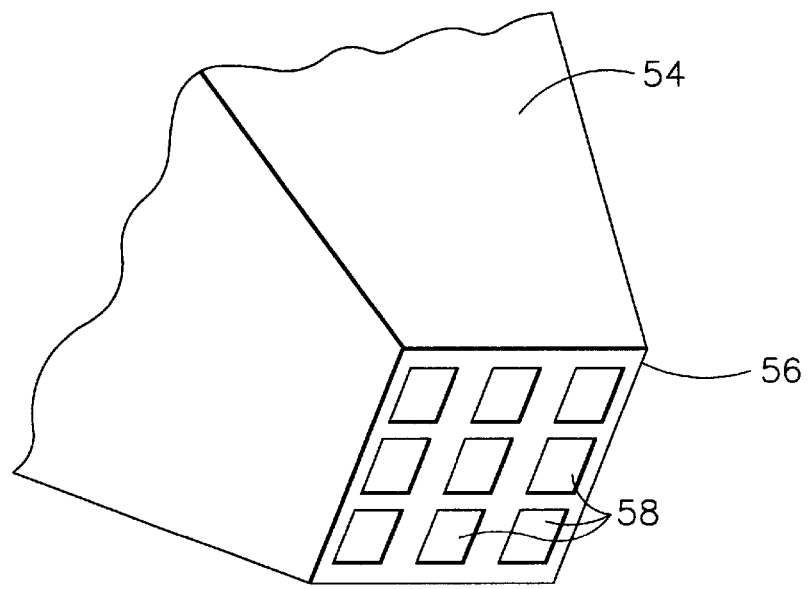
FIG. 4 is a perspective view of the contact surface of a weld tip used in the ultrasonic welding apparatus of FIG. 3.

An alternative manner for intentionally weakening the welded piece of material is to use a weld tip 54 having a deeply patterned contact surface 56 as shown in FIG. 4. It is known in the art of ultrasonic welding to provide shallow patterns on such weld tips in order to facilitate good welding by causing the weld tip to "grip" the material being welded. By contrast, the contact surface 56 is provided with a plurality of indentations 58 that are substantially deeper than those normally found on conventional weld tips. Therefore, when the contact surface 56 is pressed against the piece of bonding wire 46 during the ultrasonic welding operation, corresponding deep indentations are impressed into the outer surface of the welded piece of material. These deep indentations extend substantially into the welded piece of material, thereby weakening it internally against shear forces. As shown in FIG. 4, the deep indentations 58 are arranged in a "waffle" pattern. Other patterns such as a knurled pattern could alternatively be used. The deeply patterned tip could be used in combination with the wire strand means to provide a maximum weakening effect.

The foregoing has described a method of using ultrasonic welding to quickly and inexpensively apply dovetail seals to turbine buckets or rotor disks. The method requires little or no surface preparation of the bucket and requires no masking. While specific embodiments of the present invention have been described, it will be apparent to those skilled in the art that various modifications thereto can be made without departing from the spirit and scope of the invention as defined in the appended claims.

What is claimed is:

1. In a gas turbine engine having a rotor disk and at least one bucket mounted on said rotor disk through engagement of a dovetail portion in a corresponding disk slot formed in said rotor disk, a method of sealing said disk slot comprising ultrasonically welding a piece of metal material onto one of said dovetail portion of said disk slot.

2. The method of claim 1 wherein said piece of material is located on said one of said dovetail portion or said disk slot so as to fill a gap between said dovetail portion and said disk slot when said dovetail portion is disposed in said disk slot.

3. The method of claim 1 further comprising ultrasonically welding additional pieces of material onto said one of said dovetail portion or said disk slot.

4. The method of claim 1 wherein said piece of material is formed from aluminum.

5. The method of claim 1 wherein said piece of material is formed from a wire that is made of a plurality of wound strands.

6. The method of claim 1 wherein a pattern of deep indentations is formed in said piece of material.

7. The method of claim 1 further comprising driving said dovetail portion into said disk slot after ultrasonically welding said piece of material onto said one of said dovetail portion or said disk slot.

8. In a gas turbine engine having a rotor disk and at least one bucket mounted on said rotor disk through engagement of a dovetail portion in a corresponding disk slot formed in said rotor disk, a method of sealing said disk slot comprising the steps of:

placing a piece of material into contact with one of said dovetail portion or said disk slot;

applying a compressive force against said piece of material so as to press said piece of material against said one of said dovetail portion or said disk slot; and applying ultrasonic energy to said piece of material so as to ultrasonically weld said piece of material to said one of said dovetail portion or said disk slot.

9. The method of claim 8 wherein said piece of material is located on said one of said dovetail portion or said disk slot so as to fill a gap between said dovetail portion and said disk slot when said dovetail portion is disposed in said disk slot.

10. The method of claim 8 further comprising the steps of:

placing an additional piece of material into contact with said one of said dovetail portion or said disk slot;

applying a compressive force against said additional piece of material so as to press said additional piece of material against said one of said dovetail portion or said disk slot; and applying ultrasonic energy to said additional piece of material so as to ultrasonically weld said additional piece of material to said one of said dovetail portion or said disk slot.

11. The method of claim 8 wherein said piece of material is formed from aluminum.

12. The method of claim 8 wherein said piece of material is a wire comprising a plurality of wound strands.

13. The method of claim 8 wherein a pattern of deep indentations is formed in said piece of material.

14. The method of claim 8 further comprising driving said dovetail portion into said disk slot after ultrasonically welding said piece of material onto said one of said dovetail portion or said disk slot.

* * * * *